United States Patent
Hsu et al.

(10) Patent No.: US 9,811,664 B1
(45) Date of Patent: Nov. 7, 2017

(54) METHODS AND SYSTEMS FOR DETECTING UNWANTED WEB CONTENTS

(75) Inventors: Cheng-Hsin Hsu, Taipei (TW); Peng-Shih Pu, Taipei (TW); Chih-Chia Chen, Taipei (TW); Shr-An Su, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1570 days.

(21) Appl. No.: 13/209,807

(22) Filed: Aug. 15, 2011

(51) Int. Cl.
*G06F 21/00* (2013.01)
*G06F 21/56* (2013.01)
*H04L 29/06* (2006.01)

(52) U.S. Cl.
CPC .......... *G06F 21/563* (2013.01); *G06F 21/564* (2013.01); *H04L 63/1416* (2013.01)

(58) Field of Classification Search
CPC . H04L 63/14; H04L 63/1416; H04L 63/1408; H04L 63/1441; H04L 63/1458; G06F 21/552; G06F 21/563; G06F 21/55; G06F 21/564
USPC ......................................................... 726/23
See application file for complete search history.

(56) References Cited

U.S. PATENT DOCUMENTS

| | | |
|---|---|---|
| 5,442,699 A | 8/1995 | Arnold et al. |
| 5,452,442 A | 9/1995 | Kephart |
| 5,640,492 A | 6/1997 | Cortes et al. |
| 5,649,068 A | 7/1997 | Boser et al. |
| 5,907,834 A | 5/1999 | Kephart et al. |
| 6,078,924 A * | 6/2000 | Ainsbury et al. |
| 6,161,130 A | 12/2000 | Horvitz et al. |
| 6,192,512 B1 | 2/2001 | Chess |
| 6,279,128 B1 | 8/2001 | Arnold et al. |
| 6,622,134 B1 | 9/2003 | Sorkin |
| 6,650,890 B1 | 11/2003 | Irlam et al. |
| 6,711,583 B2 | 3/2004 | Chess et al. |
| 6,732,157 B1 | 5/2004 | Gordon et al. |
| 6,789,200 B1 | 9/2004 | Fiveash et al. |
| 6,813,712 B1 | 11/2004 | Luke |
| 7,308,648 B1 * | 12/2007 | Buchthal et al. ............. 715/234 |
| 7,660,989 B2 | 2/2010 | Tomkow |
| 7,725,544 B2 | 5/2010 | Alspector et al. |
| 7,788,576 B1 * | 8/2010 | Chen ....................... G06F 21/51 715/234 |

(Continued)

FOREIGN PATENT DOCUMENTS

| | | |
|---|---|---|
| EP | 1 377 892 B1 | 9/2004 |
| WO | 02/084459 A1 | 10/2002 |

OTHER PUBLICATIONS

Treat Reports—Trend Micro USA, 1 sheet [retrieved on Jul. 22, 2011], retrieved from the internet: http://us.trendmicro.us/trendwatch/research-and-analysis/threat-reports/index.html.

*Primary Examiner* — John B King
(74) *Attorney, Agent, or Firm* — Okamoto & Benedicto LLP

(57) ABSTRACT

Unwanted web contents are detected in an endpoint computer. The endpoint computer receives a web page from a website. The reputation of the website is determined and the web page is scanned for malicious codes to protect the endpoint computer from web threats. To further protect the endpoint computer from web threats including mutating unwanted web contents, page structure traits of the web page are generated and compared to page structure traits of other web pages detected to contain unwanted web contents.

13 Claims, 5 Drawing Sheets

(56) References Cited

U.S. PATENT DOCUMENTS

| | | | |
|---|---|---|---|
| 7,895,515 B1* | 2/2011 | Oliver et al. | 715/237 |
| 8,087,080 B1* | 12/2011 | Wan et al. | 726/22 |
| 2002/0065851 A1* | 5/2002 | Watson et al. | 707/513 |
| 2003/0009694 A1 | 1/2003 | Wenocur et al. | |
| 2003/0033531 A1* | 2/2003 | Hanner | 713/176 |
| 2004/0073617 A1 | 4/2004 | Milliken et al. | |
| 2004/0078362 A1* | 4/2004 | Kim et al. | 707/3 |
| 2004/0117648 A1* | 6/2004 | Kissel | 713/200 |
| 2004/0148500 A1 | 7/2004 | Olkin et al. | |
| 2005/0010644 A1 | 1/2005 | Brown et al. | |
| 2005/0060643 A1 | 3/2005 | Glass et al. | |
| 2005/0080860 A1 | 4/2005 | Daniell et al. | |
| 2005/0097179 A1 | 5/2005 | Orme | |
| 2005/0223027 A1 | 10/2005 | Lawrence et al. | |
| 2006/0161986 A1 | 7/2006 | Singh et al. | |
| 2006/0253579 A1* | 11/2006 | Dixon | G06Q 30/02 709/225 |
| 2008/0127338 A1* | 5/2008 | Cho et al. | 726/22 |
| 2008/0301796 A1* | 12/2008 | Holostov et al. | 726/12 |
| 2009/0282476 A1* | 11/2009 | Nachenberg et al. | 726/22 |
| 2010/0017880 A1* | 1/2010 | Masood | 726/24 |
| 2011/0138465 A1* | 6/2011 | Franklin et al. | 726/23 |
| 2011/0239294 A1* | 9/2011 | Kim | G06F 21/566 726/22 |
| 2011/0283356 A1* | 11/2011 | Fly et al. | 726/22 |

\* cited by examiner rgejedqsuvt.blogspot.com.htm    qcrdkisybbdscp.blogspot.com.htm

```
1  <!DOCTYPE html PUBLIC "-//W3C//DTD XHTML 1.0 Transitional//EN" "http://www.w3.org/TR/xhtml1/DTD/xhtml1-transitiona
2  <html xmlns="http://www.w3.org/1999/xhtml">
3  <meta http-equiv="Content-Type" content="text/html; charset=iso-8859-1" />
4  <title>I Love You</title>
5  <!-- --><!-- --><style type="text/css">@import url(http://www.blogger.com/css/navbar/classic.css);
6  div.b-mobile {display:none;}
7  </style>
8
9  </head><body><iframe src="http://www.blogger.com/navbar.g?targetBlogID=5550399436273029447&blogName=qcrdkisybb
10 <div id="space-for-ie"></div>
11 <center>
12 <br><br><br>
13 <a href="http://superdrugtesting.com/love.exe"><img src="http://superdrugtesting.com/lh.jpg" border="0"><br></a><b
14 Your download should start automatically in a few seconds.<br>
15 If not, <a href="http://superdrugtesting.com/withlove.exe">click here</a> to start the download and choose either
16 </center>
17 </body>
18 </html>
```

<html><meta><title><style><body><iframe><div><center><br><br><br><a><img><br><br><a>

METHODS AND SYSTEMS FOR DETECTING UNWANTED WEB CONTENTS

BACKGROUND OF THE INVENTION

1. Field of the Invention

The present invention relates generally to computer security, and more particularly but not exclusively to methods and apparatus for detecting unwanted web contents.

2. Description of the Background Art

Unwanted web contents, such as phishing, pornography, spam, and malicious contents, are all over the World Wide Web despite efforts by various computer security vendors. Techniques for creating and propagating unwanted web contents are not just becoming more sophisticated but also relatively simpler to implement. These techniques include fast flux, search engine optimization, social engineering, and use of toolkits. Toolkits, which are also known as "Phish-Kits", even allow non-technologically savvy users to become cyber criminals by providing pre-written templates. Worse, websites serving web pages with unwanted web contents may have changing domain names to evade detection by URL (uniform resource locator) filtering.

SUMMARY

In one embodiment, a method of detecting unwanted web contents includes determining a reputation of a website serving a web page. The web page is received from the website. The web page is scanned for malicious codes. Page structure traits of the web page are generated by extracting markup language tags from the web page and forming the extracted markup language tags into a pattern. Mutating unwanted web contents in the web page are detected by comparing the page structure traits of the web page against other page structure traits.

In another embodiment, a method of generating page structure traits for detecting unwanted web contents includes retrieving web pages from a plurality of websites. The web pages are analyzed for unwanted web contents. Page structure traits of web pages detected to have unwanted web contents based on the analysis of the web pages are generated. The page structure traits are provided to a plurality of endpoint computers. The page structure traits are used in the endpoint computers to detect unwanted web contents in other web pages.

In another embodiment, a method of detecting unwanted web contents includes receiving a web page from a website. Page structure traits of the web page are generated. The page structure traits of the web page are compared against other page structure traits to detect unwanted web content in the web page. Feedback information are transmitted based on the comparison of the page structure traits of the web page against the other page structure traits.

These and other features of the present invention will be readily apparent to persons of ordinary skill in the art upon reading the entirety of this disclosure, which includes the accompanying drawings and claims.

DESCRIPTION OF THE DRAWINGS

FIGS. 4 and 5 graphically illustrate an algorithm for generating page structure traits in accordance with an embodiment of the present invention.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
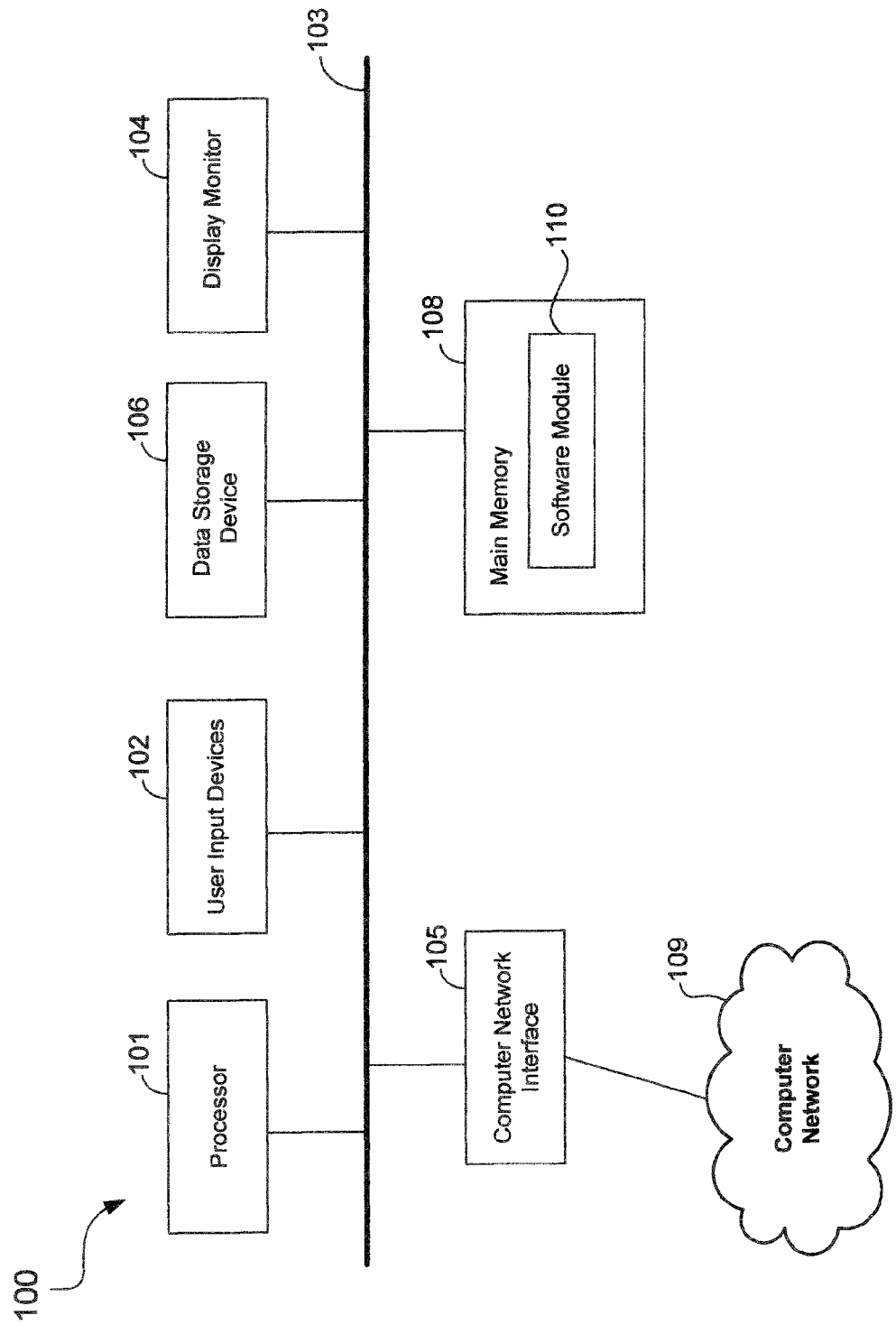
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as an endpoint computer, a web server computer, a feedback server computer, an update server computer, or a support server computer shown in FIG. 2.

The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. The computer 100 may be configured to perform its functions by executing the software modules 110. The software modules 110 may be loaded from the data storage device 106 to the main memory 108. The software modules 110 may also be made available in other computer-readable medium including optical disk, flash drive, and other memory devices.

Figure 2:
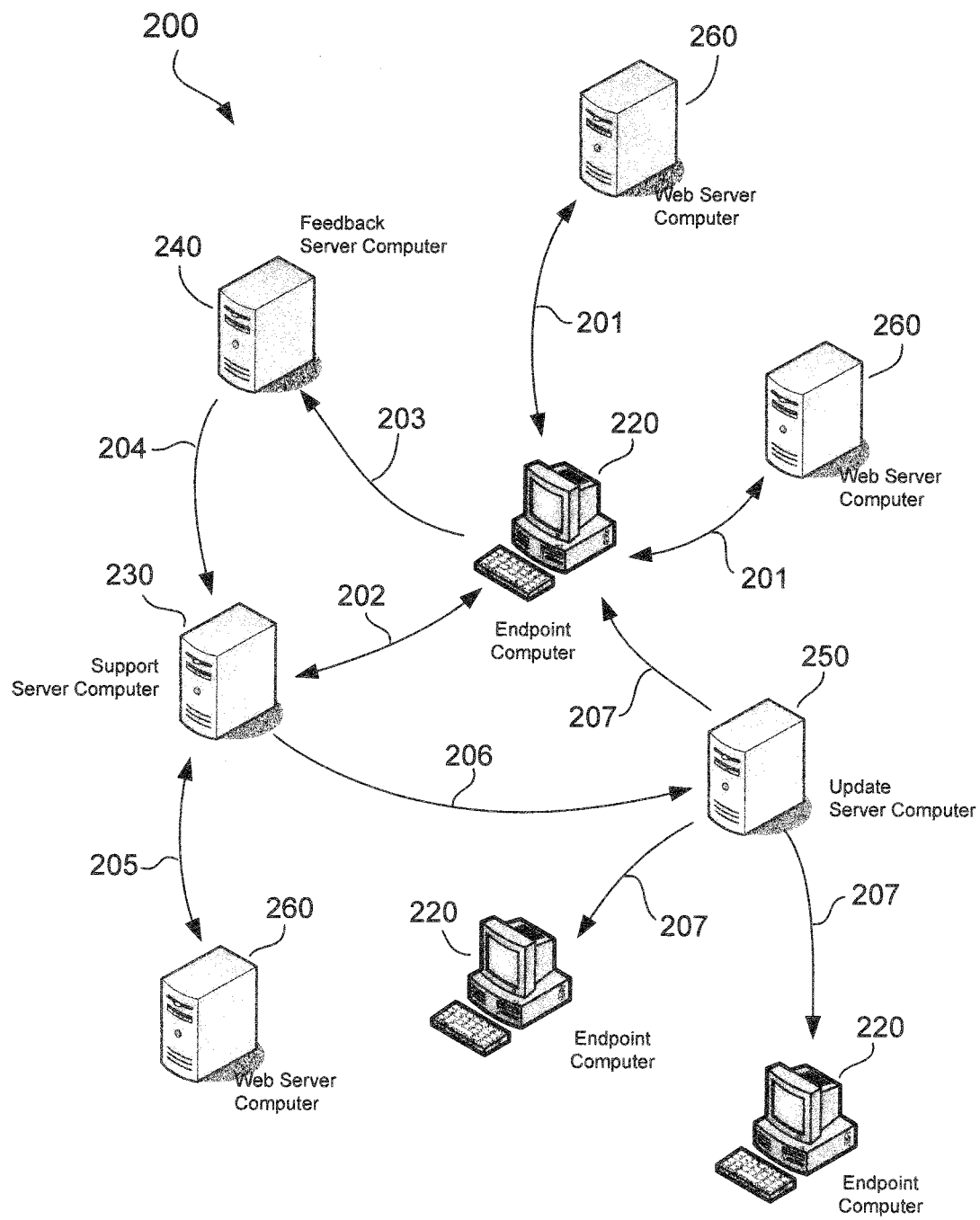
FIG. 2 schematically shows a system for detecting unwanted web contents in accordance with an embodiment of the present invention.

FIG. 2 schematically shows a system 200 for detecting unwanted web contents in accordance with an embodiment of the present invention. In the example of FIG. 2, the system 200 comprises a plurality of endpoint computers 220, a support server computer 230, a feedback server computer 240, and an update server computer 250. Only one of each of the aforementioned server computers is shown in FIG. 2 for clarity of illustration. In practice, there may be one or more of the aforementioned server computers. As can be appreciated, the functionality of a server computer may be performed by a plurality of cooperatively working computers. The computers shown in FIG. 2 communicate over the Internet.

An endpoint computer 220 may comprise a computer employed by a user. The user may be an individual, in which case the endpoint computer 220 may comprise a client computer. The user may also be an organization, such as a corporation, in which case the endpoint computer 220 may comprise a server computer employed as an Internet gateway. The endpoint computer 220 is so named because it is the computer where unwanted web content filtering is performed. The endpoint computer 220 is configured to detect and block unwanted web contents, and provide feedback information to the feedback computer 240.

The support server computer 230 may comprise a server computer configured to support computer security operations in the endpoint computers 220. In the example of FIG. 2, the support server computer 230 may provide web threat protection services, such as web reputation service, antispam service, etc., to an endpoint computer 220. The support server computer 230 may be configured to retrieve and analyze web contents available on the Internet, to generate page structure traits of web pages containing unwanted web contents, and to provide the page structure traits of the web pages containing unwanted web contents to the update server computer 250 for distribution to the endpoint computers 220.

The feedback server computer 240 may comprise a server computer configured to receive feedback information from the endpoint computers 220, and to provide the feedback information to the support server computer 230. The feedback information from the endpoint computers 220 may comprise page structure traits of web pages detected to contain unwanted web contents and other information about the web pages, such as domain names of websites hosting the web pages. The feedback computer 240 may be configured to convert the feedback information into a form that can be processed by the support server computer 230. Depending on its configuration, the feedback computer 240 may also be configured to perform clustering of page structure traits and correlation of domain names and page structure traits, and provide the results of the clustering and correlation operations to the support server computer 230.

The update server computer 250 may comprise a server computer configured to provide computer security-related updates to the endpoint computers 220. The update server computer 250 may be configured to periodically provide malicious code signatures to the endpoint computers 220, as well as updates to computer security software in the endpoint computers 220. In the example of FIG. 2, the update server computer 250 is configured to periodically provide updates to page structure traits employed in the endpoint computers 220 to detect unwanted web contents.

The support server computer 230, the feedback server computer 240, and the update server computer 250 may comprise computers maintained and operated by the same computer security vendor providing computer security services in the endpoint computers 220. As can be appreciated, the functionalities of the support server computer 230, the feedback computer 240, and the update server computer 250 may be combined or distributed among one or more computers.

In an example operation, a user employs an endpoint computer 220 to browse web pages of a website hosted by a web server computer 260 on the Internet (arrow 201). The web server computer 260 may be a malicious server computer. For example, the web server computer 260 may be configured to distribute unwanted web contents, such as contents of web pages for phishing, pornography, spam, malicious codes propagation, and so on. The endpoint computer 220 communicates with the support server computer 230 (arrow 202) to receive support for computer security operations in the endpoint computer 220. In one embodiment, the support server computer 230 provides web reputation service to the endpoint computer 220. The endpoint computer 220 may forward to the support server computer 230 the domain name, URL, or other information identifying web pages served from the web server computer 260. Based on received identifying information of the web pages, the support server computer 230 informs the endpoint computer 220 whether or not the web server computer 260 poses a computer security threat. The endpoint computer 220 may further include components for scanning received web pages for malicious codes.

As will be more apparent below, the endpoint computer 220 further includes components for detecting unwanted web contents, including unwanted mutating web contents. The mutating web contents may be variants or mutated versions of other unwanted web contents, such as unwanted web contents generated using the same template. When the endpoint computer 220 detects unwanted web contents, the endpoint computer 220 reports the event by providing corresponding feedback information to the feedback server computer 240 (arrow 203), which forwards the feedback information to the support server computer 230 (arrow 204). The support server computer 230 analyzes the feedback information to generate page structure traits that may be employed by the endpoint computers 220 to detect unwanted web contents, including mutating web contents. The support server computer 230 may also retrieve web pages from websites hosted by the web server computers 260 (arrow 205), detect mutating unwanted web contents from the retrieved web pages, and generate page structure traits that may be used to detect the mutating unwanted web contents in the endpoint computers 220. The support server computer 230 may provide the page structure traits to the update server computer 250 (arrow 206), which distributes the page structure traits to the endpoint computers 220 (arrows 207).

Figure 3:
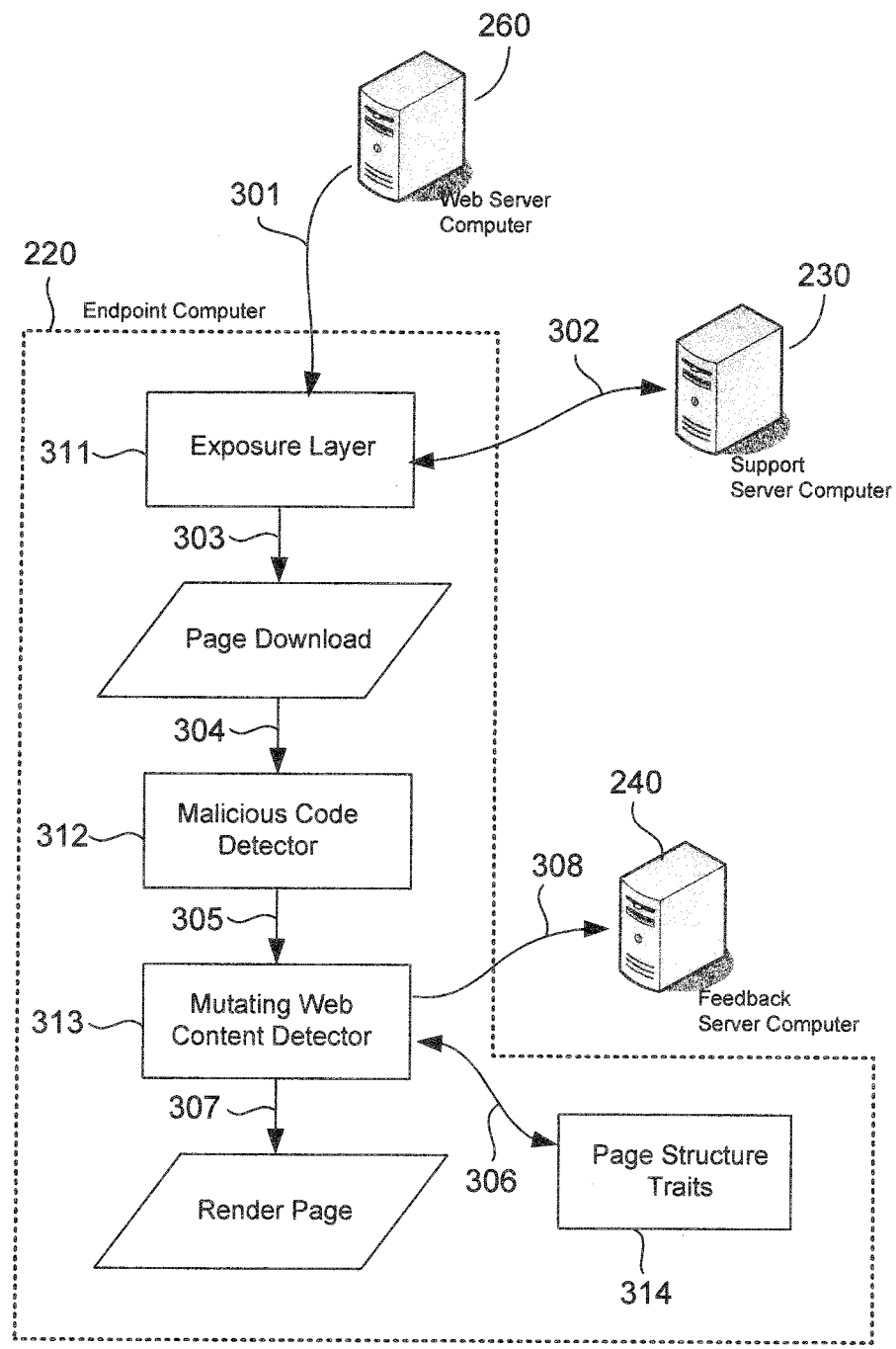
FIG. 3 shows a flow diagram of a method of detecting unwanted web contents in accordance with an embodiment of the present invention.

FIG. 3 shows a flow diagram of a method of detecting unwanted web contents in accordance with an embodiment of the present invention. In the example of FIG. 3, an endpoint computer 220 comprises an exposure layer 311, a malicious code detector 312, and a mutating web content detector 313. The endpoint computer 220 further comprises a web browser (not shown).

The exposure layer 311 may comprise computer-readable program code for providing web reputation service. In one embodiment, the exposure layer 311 is configured to receive communications from a web server computer 260 hosting a website (arrow 301). Before downloading a web page from the website, the exposure layer 311 is configured to determine the reputation of the website by consulting with the support server computer 230 (arrow 302). The endpoint computer 220 may obtain the identifying information of the web page, such as URL of the website hosting the web page, and provide the identifying information to the support server computer 230. The support server computer 230 may compare the identifying information to those of known good and malicious web pages/websites, and provide the result of the comparison to the endpoint computer 220. Web pages of websites that have a bad reputation are blocked by the exposure layer 311, while web pages of websites that have an unknown or a good reputation are allowed to be received in the endpoint computer 220. In general, this may be enough to detect unwanted web contents. However, web pages containing unwanted web contents may be constantly moved from one website to another, making it relatively difficult to keep track of web pages with unwanted web contents. The exposure layer 311 downloads the web page from the web server computer 260 to the endpoint computer 220 (arrow 303) when the exposure layer 311 deems the web page to be safe.

The exposure layer 311 may also include a white list of known good websites and a black list of known bad websites. The white and black lists may be generated in the support server computer 230 and distributed to the endpoint computer 220 by the update server computer 250. The exposure layer 311 may be configured to allow downloading of web pages from websites on the white list, and to block web pages from websites on the black list.

The malicious code detector 312 may comprise computer-readable program code for detecting malicious codes. The malicious code detector 312 may comprise a malicious code scanner, such as a malicious script analyzer, behavior analyzer, or a signature-based antivirus. The malicious code detector 312 scans the web page for malicious codes (arrow 304). When the web page contains mutating unwanted web content, it may be difficult for the malicious code detector 312 to detect the unwanted web content. For example, although the malicious code detector 312 may include patterns or signatures for detecting a particular unwanted web content, the malicious code detector 312 may not have patterns of signatures for detecting numerous variants of the particular unwanted web content. Mutating unwanted web contents thus pose a major challenge to currently available malicious code detectors. Accordingly, the endpoint computer 220 further includes the mutating web content detector 313.

The mutating web content detector 313 may comprise computer-readable program code configured to detect unwanted web contents including variants of unwanted web contents. In the example of FIG. 3, the mutating web content detector 313 receives the web page (arrow 305) when the malicious code detector 312 does not detect malicious codes in the web page. In one embodiment, the mutating web content detector 313 is configured to generate page structure traits of the web page, and compare the page structure traits of the web page to a datastore of page structure traits 314. The datastore of page structure traits 314 is preferably local to the endpoint computer 220, but may also be external to the endpoint computer 220. For example, the datastore of page structure traits 314 may be available over a computer network. The datastore of page structure traits 314 may be periodically updated with page structure traits received from the update server computer 250 (see FIG. 2).

The page structure traits of a web page comprise the skeleton or framework of the web page. The page structure traits may comprise markup language tags that are formed together to represent the structure of the web page. For example, the page structure traits may be generated by extracting the markup language tags of the web page and forming the extracted markup language tags into a pattern. The pattern may be formed by linking or concatenating together the extracted markup language tags into a string.

Because the page structure traits are based on the structure of the web page rather than the web content itself, the page structure traits allow for identification of mutating web contents. That is, once a web page having unwanted web contents is identified, the page structure traits of the web page may be employed to detect other web pages with different web contents but with the same page structure traits, such as web pages generated using the same template of a toolkit.

In one embodiment, the page structure traits comprise HTML (hypertext markup language) tags of the web page. The HTML tags may be extracted from the web page and formed into a pattern by linking the extracted HTML tags together. An algorithm for generating page structure traits in accordance with an embodiment of the present invention is graphically illustrated with reference to FIGS. 4 and 5.

FIG. 4 shows a source code of a web page 400 containing unwanted web content. FIG. 5 shows page structure traits 500 of the web page 400 in accordance with an embodiment of the present invention. In the example of FIG. 5, the page structure traits 500 are generated by extracting HTML tags (those delineated by brackets in FIG. 4) of the web page 400, and concatenating the extracted HTML tags together as a single string. Note that in the example of FIG. 5, the resulting page structure traits 500 do not include URLs, graphical images, and displayed texts that are included in the web page 400. This enables use of the page structure traits 500 to detect variants of the web content of the web page 400 even when the URLs, graphical images, displayed texts, and other variable portions of the web content are changed.

In general, detection of mutating unwanted web contents may be described by:

Skeleton(C)*ΦϵT where C is the original web page content, Skeleton( ) is a function of computing page structure traits to converge mutation degrees, ϕ is a coefficient used to fine-tune the power of Skeleton( ), and T is the page structure trait set of a web page with unwanted web content. For any kind of web page with content C, page structure traits may be computed and fine tuned. Original web page content is mutated if it belongs to one of unwanted web page structure traits T. As a particular example, the page structure traits of a web page may be generated and then normalized by the coefficient ϕ. The normalized page structure traits of the web page may then be compared to other page structure traits to determine whether or not the web page contains unwanted web content.

Continuing with the example of FIG. 3, the datastore of page structure traits 314 may comprise page structure traits indicative of unwanted web content. The page structure traits 314 may have been generated from web pages found to have unwanted web content. The mutating web content detector 313 compares the page structure traits of the web page received from the web server computer 260 to the datastore of page structure traits 314 (arrow 306) to determine if the web page contains unwanted web content.

The mutating web content detector 313 allows the web page to be rendered (arrow 307) by the web browser when the web content of the web page is legitimate, i.e., not unwanted. Otherwise, when the web page comprises unwanted web content, the mutating web content detector 313 blocks the web page and reports the event to the feedback server computer 240 as feedback information (arrow 308). The feedback information may comprise the page structure traits of the web page and domain name of the website hosted by the web server computer 260, for example.

Figure 6:
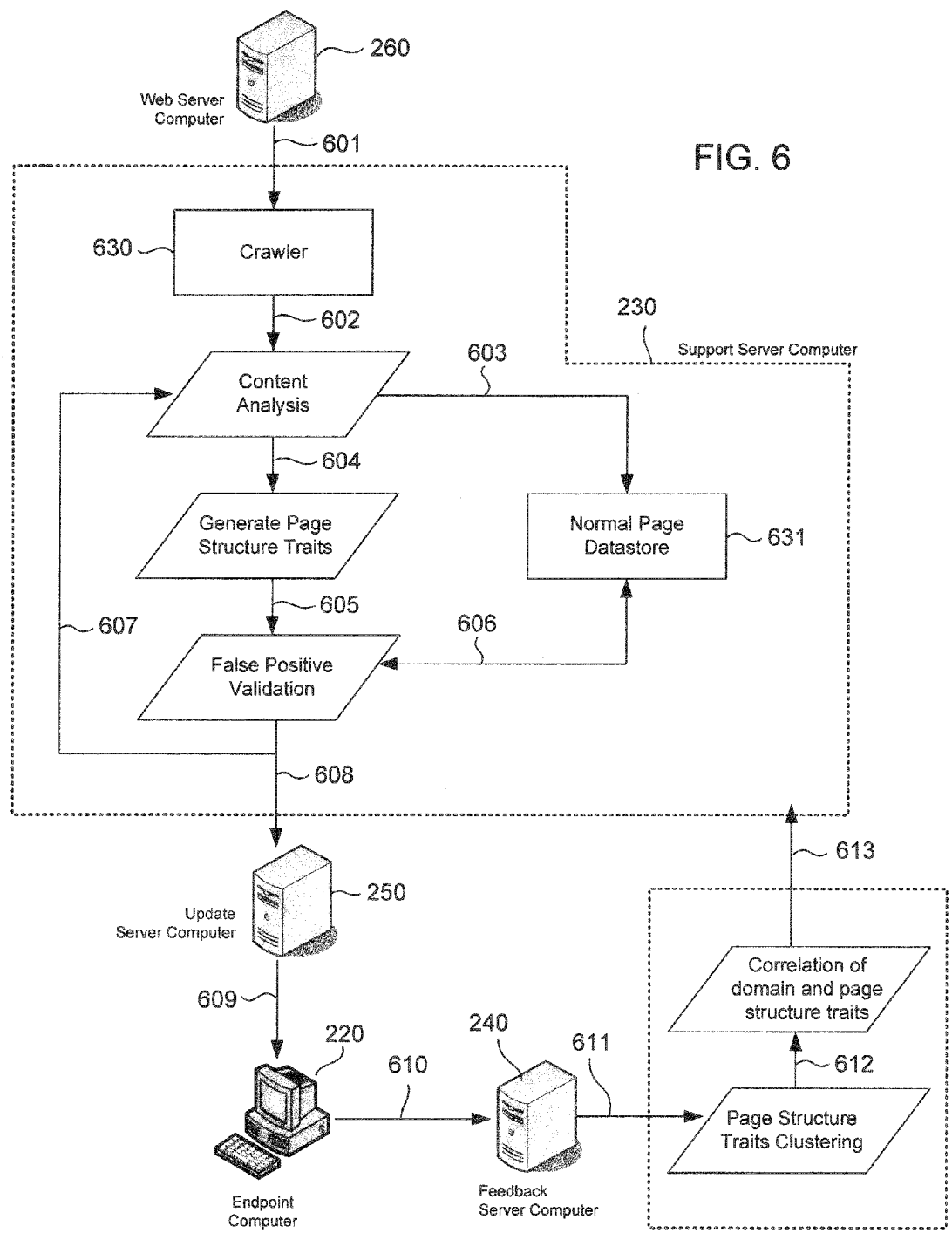
FIG. 6 shows a flow diagram of a method of generating page structure traits for detecting unwanted web contents in accordance with an embodiment of the present invention.

FIG. 6 shows a flow diagram of a method of generating page structure traits for detecting unwanted web contents in accordance with an embodiment of the present invention. In the example of FIG. 6, the steps performed in the support server computer 230 and feedback server computer 240 may be performed by computer-readable program code (e.g., scripts) or by antivirus researchers. The support server computer 230 and the feedback server computer 240 may be, for example, maintained and operated by antivirus researchers of TrendLabs[SM] research, development, and support center of Trend Micro, Inc.

In the example of FIG. 6, the support server computer 230 includes a web crawler 630. The web crawler 630 may comprise computer-readable code for retrieving web pages from websites on the Internet. The web crawler 630 may retrieve web pages as driven by user queries, feedback information, or other feeds. Crawling for web pages allow for detection of unwanted web contents before they are received in an endpoint computer 220.

In the example of FIG. 6, the web crawler 630 retrieves a web page from a website hosted by a web server computer 260 (arrow 601). The web page is analyzed for unwanted web content (arrow 602) using conventional analysis modules, such as script analyzers, support vector machines (for categorization), phishing detectors, and other modules or techniques employed by computer security vendors to detect unwanted web contents.

Web pages that contain legitimate contents, also referred to as "normal pages," are stored in a normal page datastore 631 (arrow 603). Web pages that contain unwanted web content are processed to generate corresponding page structure traits (arrow 604). That is, when the content analysis indicates that the web page from the web server computer 260 contains unwanted web content, the page structure traits of the web page are generated. The page structure traits of the web page may be generated using the algorithm previously described with reference to FIGS. 4 and 5, for example. On the other hand, when the web page contains legitimate content, the web page is stored in the normal page datastore 631. Web pages in the normal page datastore 631 may be stored with corresponding page structure traits for ease of comparison with newly generated page structure traits during false positive validation. As can be appreciated, the page structure traits in the datastore 631 may be generated using the same algorithm used to generate page structure traits in the support server computer 230 and in the endpoint computers 220.

Page structure traits of web pages containing unwanted web contents are validated for false positives (arrow 605). A false positive occurs when legitimate web content is deemed to be unwanted. In the example of FIG. 6, false positive validation is performed by comparing newly generated page structure traits to page structure traits of normal pages in the datastore 631 (arrow 606). Features of the newly generated page structure traits that may lead to false positives (i.e., features that make the newly generated page structure traits very similar to normal pages) may be removed from the newly generated page structure traits to reduce false positives. Newly generated page structure traits that have been validated to prevent false positives, also referred to as "validated page structure traits," may be employed to improve content analysis (arrow 607). For example, the domain names associated with newly generated page structure traits may be added to web reputation databases.

Validated page structure traits may be distributed to the endpoint computers 220 by way of the update server computer 250 (arrows 608 and 609). In the endpoint computers 220, validated page structure traits may be stored in the datastore of page structure traits 314 (see FIG. 3) for detecting unwanted web contents. Page structure traits of a web page detected in an endpoint computer 220 as containing unwanted web content may be provided to the feedback server computer 240 as feedback information (arrow 610).

In the feedback server computer 240 or in the support server computer 230, page structure traits received from endpoint computers 220 may be segregated into various groups using a clustering algorithm (arrow 611). For example, the same or very similar page structure traits may be clustered together. The clustering of same or very similar page structure traits may aid in the investigation of particular tool kits. The domain names of websites serving web pages containing unwanted web contents and corresponding page structure traits may also be correlated (arrow 612) to obtain additional information that may be useful in detecting other mutating web contents or identifying trends. As a particular example, page structure traits of web pages from google.com and google.com.tw may be similar because they are from the same company albeit for different geographic locations, indicating normal behavior. However, very similar page structure traits of web pages from paypal.com, paypal.com.hosting.com, and example.com indicate abnormal behavior and thus needs further investigation. The results of the clustering and correlation steps may be employed to improve other steps (arrow 613) including generation of page structure traits, false positive validation, and publishing of page structure traits to the endpoint computers 220.

Methods and systems for detecting unwanted web contents have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting unwanted web contents, the method to be performed by a first computer and a second computer that each comprises a processor and a memory, the method comprising:

the first computer receiving a first web page from a first website;

the first computer extracting a plurality of hypertext markup language (HTML) tags from the first web page;

the first computer generating page structure traits of the first web page by forming the plurality of HTML tags together into a pattern that comprises the plurality of HTML tags;

the first computer comparing the page structure traits of the first web page to page structure traits of a normal web page;

to prevent false positives, the first computer removing from the page structures of the first web page a feature that makes the page structure traits of the normal web page match the page structure traits of the first web page;

the second computer receiving the page structure traits of the first web page after the feature has been removed from the page structure traits of the first web page; and the second computer detecting unwanted web content in a second web page received from a second website by comparing page structure traits of the second web page against the page structure traits of the first web page.

2. The method of claim 1, wherein the second web page is received by the second computer in response to determining that the second website has a good reputation, and the second computer compares the page structure traits of the second web page to the page structure traits of the first web page after determining that the second website has the good reputation.

3. The method of claim 1, further comprising:
determining a reputation of the second website by consulting another computer that compares identifying information of the second website to identifying information of known malicious websites.

4. The method of claim 1, wherein the pattern comprises the plurality of HTML tags extracted from the first web page but the pattern does not include any uniform resource locator (URL) from the first web page.

5. The method of claim 1, wherein the pattern only includes the plurality of HTML tags.

6. The method of claim 1, wherein page structure traits of other web pages are periodically received in the second computer.

7. The method of claim 1, further comprising:
prior to the second computer detecting unwanted web content in the second web page, the second computer scanning the second web page for malicious codes, and wherein the second computer detects unwanted web content in the second web page in response to not detecting malicious codes in the second web page during the scanning of the second web page for malicious codes.

8. The method of claim 1, further comprising:
the second computer providing the page structure traits of the second web page over a computer network to a feedback server computer when the web page is deemed to be containing unwanted web content.

9. The method of claim 1, wherein the page structure traits of the first web page comprises the HTML tags concatenated together into a string.

10. The method of claim 1, further comprising:
the first computer detecting that a third web page is another normal web page when the third webpage has page structure traits that match page structure traits of a fourth web page, and the third and fourth web pages are hosted under different domain names in different geographical locations but belonging to a same company.

11. A method of generating page structure traits for detecting unwanted web contents, the method to be performed by a server computer comprising a processor and a memory, the method comprising:
the server computer retrieving web pages from a plurality of websites;
the server computer analyzing the web pages for unwanted web contents;
the server computer generating malicious page structure traits of web pages detected to have unwanted web contents based on the analysis of the web pages, each of the malicious page structure traits comprising a plurality of hypertext markup language (HTML) tags that are extracted from a corresponding web page and formed together into a pattern and matching page structure traits of a plurality of web pages;
the server computer comparing the malicious page structure traits to normal page structure traits of normal web pages;
to prevent false positives, the server computer removing from the malicious page structure traits features that make the normal page structure traits of normal web pages match the malicious page structure traits;
after removing the features from the malicious page structure traits, the server computer providing the malicious page structure traits to a plurality of endpoint computers; and
in the plurality of endpoint computers, comparing the malicious page structure traits to page structure traits of other web pages to detect unwanted web contents in the other web pages.

12. The method of claim 11, further comprising:
the server computer receiving page structure traits of web pages received in the plurality of endpoint computers and having unwanted web contents.

13. The method of claim 11, wherein each of the malicious page structure traits comprises extracted HTML tags that are concatenated together into a string.

* * * * *